J. FINGER.
CONVERTIBLE AUTO SEAT.
APPLICATION FILED AUG. 29, 1921.

1,402,854.

Patented Jan. 10, 1922.

Inventor

Jonas Finger

By Watson E. Coleman, Attorney

UNITED STATES PATENT OFFICE.

JONAS FINGER, OF FORT COLLINS, COLORADO.

CONVERTIBLE AUTO SEAT.

1,402,854.  Specification of Letters Patent.  Patented Jan. 10, 1922.

Application filed August 29, 1921. Serial No. 496,238.

*To all whom it may concern:*

Be it known that I, JONAS FINGER, a citizen of the United States, residing at Fort Collins, in the county of Larimer and State of Colorado, have invented certain new and useful Improvements in Convertible Auto Seats, of which the following is a specification, reference being had to the accompanying drawings.

This invention relates to motor vehicle seats and more particularly to seats for touring automobiles, and the principal object of the invention is to provide a simple and efficient device whereby the front seat of the vehicle may be converted into an extension of the back or tonneau seat so as to produce a bed which may be used by the occupants of the vehicle at night.

Another object of the invention is the provision of a seat which may be converted into a bed within a minimum space of time and with a minimum amount of trouble.

Another object of the invention is the provision of a convertible seat of the character described in which the means for supporting the back of the front seat in vertical position may also be utilized to support the back when in horizontal position.

Figure 1:
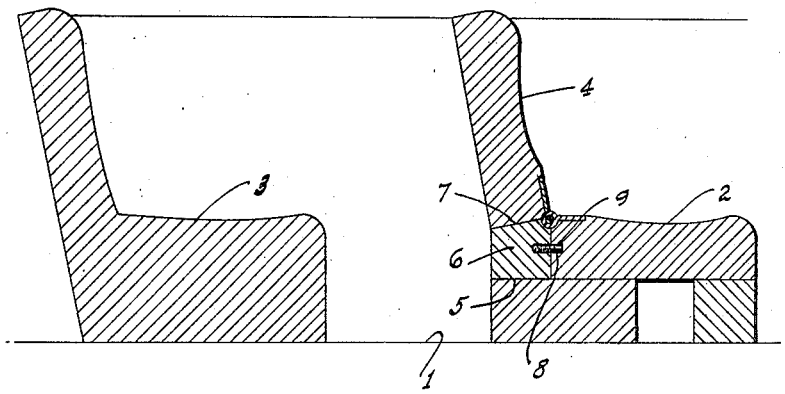
Figure 2:
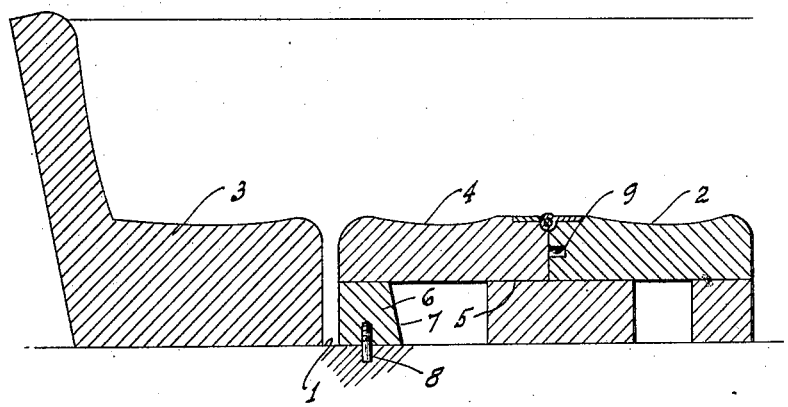

Further objects of the invention will appear as the following specific description is read in connection with the accompanying drawings which form a part of this application, and in which:

Figure 1 is a detail longitudinal sectional view taken through the vehicle showing the back of the seat in vertical position; and Figure 2 is a similar view showing the seat back in lowered bed forming position.

Referring more particularly to the drawing, 1 represents the floor of the vehicle, 2 the front seat thereof which is supported above the floor in any suitable manner and 3 the back seat, all constituting parts of the ordinary touring car. Hinged to the upper rear edge of the front seat 2 is a back member 4 which is of usual construction and which is adapted to hold to the position shown in Figure 2 where it lies in a plane with the seat and has its upper rear edge substantially contacting with the forward front edge of the rear seat 3.

In carrying out this invention I preferably provide the rear support of the front seat 2 with a rearward extension forming a shoulder or seat 5 which is adapted to support the lower end of the back when in horizontal position, as shown in Figure 2, and which receives and supports the limiting block 6 beveled upon its upper surface, as shown at 7, for a purpose to be hereinafter described and provided with a projection 8 on its forward face arranged to engage a socket 9 in the rear wall of the seat 2 so that displacement of the block is prevented when in position to support the seat back 4 in upright position.

When the seat 2 is occupied by the chauffeur in driving the vehicle, the back 4 is elevated to the position shown in Figure 1 and has its lower edge engaged with the inclined edge 7 of the supporting and spacing block 6 so that the back 4 is slightly inclined, as shown. When it is desired to utilize the back as an extension of the seat 2 and the seat 3, the back 4 is moved forward slightly so as to permit of the removal of the block 6 which after removal is placed on the floor beneath the rear or upper end of the back 4, thus supporting the same in horizontal position and with its upper surface in the plane of the upper surface of the seats 2 and 3. In this position the occupants of the vehicle may be stretched out full length in the same manner as in bed.

What I claim is:

In a device of the class described, a seat, a back hinged to the upper rear edge of the seat and adapted to fall in a plane with the seat or at substantial right angles thereto, a support for the seat, a block removably interposed between the support and the lower edge of the back for supporting the back in substantially vertical position, said block adapted to support the free upper edge of the back when alined with the seat, and coacting means on the block and seat for preventing displacement of the block when utilized for supporting the back in substantially vertical position.

In testimony whereof I hereunto affix my signature.

JONAS FINGER.